United States Patent
Feller et al.

(10) Patent No.: US 9,910,722 B2
(45) Date of Patent: Mar. 6, 2018

(54) GENERIC CALLBACK HANDLING

(71) Applicant: SAP SE, Walldorf (DE)

(72) Inventors: Benedikt Feller, Ketsch (DE); Markus Guenter Dobler, Schifferstadt (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/982,021

(22) Filed: Dec. 29, 2015

(65) Prior Publication Data
US 2017/0185460 A1    Jun. 29, 2017

(51) Int. Cl.
*G06F 3/00* (2006.01)
*G06F 9/54* (2006.01)
*G06F 3/0484* (2013.01)

(52) U.S. Cl.
CPC .......... *G06F 9/542* (2013.01); *G06F 3/0484* (2013.01); *G06F 9/541* (2013.01); *G06F 9/543* (2013.01)

(58) Field of Classification Search
CPC .................................. G06F 9/54; G06F 9/541
USPC ................................................. 719/310, 328
See application file for complete search history.

(56) References Cited

U.S. PATENT DOCUMENTS

| | | | | |
|---|---|---|---|---|
| 2001/0020243 A1* | 9/2001 | Koppolu | ........... | G06F 17/30855 715/205 |
| 2004/0078486 A1* | 4/2004 | Salahshoor | ............. | H04L 67/42 709/245 |
| 2008/0127121 A1* | 5/2008 | Fenton | .................. | G06F 9/4443 717/131 |
| 2015/0067763 A1* | 3/2015 | Dalcher | ................ | G06F 21/566 726/1 |

OTHER PUBLICATIONS

Masahide Nakamura, Application Framework for Efficient Development of Sensor as a Service for Home Network System, 2011.*

* cited by examiner

*Primary Examiner* — Lechi Truong
(74) *Attorney, Agent, or Firm* — Klarquist Sparkman, LLP

(57) ABSTRACT

A framework for generically handling callbacks is described herein. In accordance with one aspect, multiple components or data objects are registered. The registration of a component includes providing a context name and one or more callbacks. A callback of each registered component references to the component and is registered under a context. A trigger may be invoked in response to receiving an event, where a context is provided to the trigger based on the event. A set of callbacks that are registered under the context are then triggered. The triggered callbacks reference to components registered under the context.

20 Claims, 3 Drawing Sheets

200

GENERIC CALLBACK HANDLING

TECHNICAL FIELD

The present disclosure relates generally to computer systems, and more particularly to a framework for generic callback handling.

BACKGROUND

Callback functions are used in software applications for a wide variety of purposes including handling events in a program. For example, in graphical user interface (GUI) development scenarios, large amounts of callbacks are employed to provide a mechanism for user interaction and input, for notifying about status change in an application, and other events and actions. Callbacks are typically triggered by iterating through components at the trigger point. This may be error prone especially for systems employing large amounts of components and callbacks used in relation to the components, as well as expend more computing resources, for example, in the UI operations.

It is therefore desirable to provide a framework for efficiently handling callbacks.

SUMMARY

A framework for generically handling callbacks is described herein. In accordance with one aspect, multiple components or data objects are registered. The registration of a component includes providing a context name and one or more callbacks. A callback of each registered component references to the component and is registered under a context. A trigger may be invoked in response to receiving an event, where a context is provided to the trigger based on the event. A set of callbacks that are registered under the provided context are then triggered. The triggered callbacks reference to components registered under the context.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for generic callback handling is provided. In accordance with one aspect, the framework provides a generic pattern which may be used for handling callbacks. In one implementation, the framework includes a registration-trigger-callback pattern for generically triggering registered callbacks of components or data objects. The components may be registered with a specific context and one or more callbacks. For example, any type of component may be registered with a specific context and one or more callbacks. The framework allows multiple components to be registered under the same context. The framework invokes the callbacks of all registered components belonging to the same context in response to a trigger. The framework advantageously allows generic triggering of the registered callbacks rather than iterating through components at the trigger point.

In some implementations, the framework uses the generic pattern for handling callbacks of user interface (UI) components. The framework may be used to handle callbacks of all types of UI components. The generic pattern enables modification of the UI components in various UI development scenarios. The framework may be used in UI development scenarios such as field property handling (e.g., enabling, disabling, setting mandatory, read-only) of UI components. In other implementations, the generic pattern may be applied to backend scenarios. The framework may be advantageously used in various other scenarios due to the generic approach of triggering the callbacks.

The framework described herein may be implemented as a method, a computer-controlled apparatus, a computer process, a computing system, or as an article of manufacture such as a computer-usable medium. These and various other features will be apparent from the following description.

Figure 1:
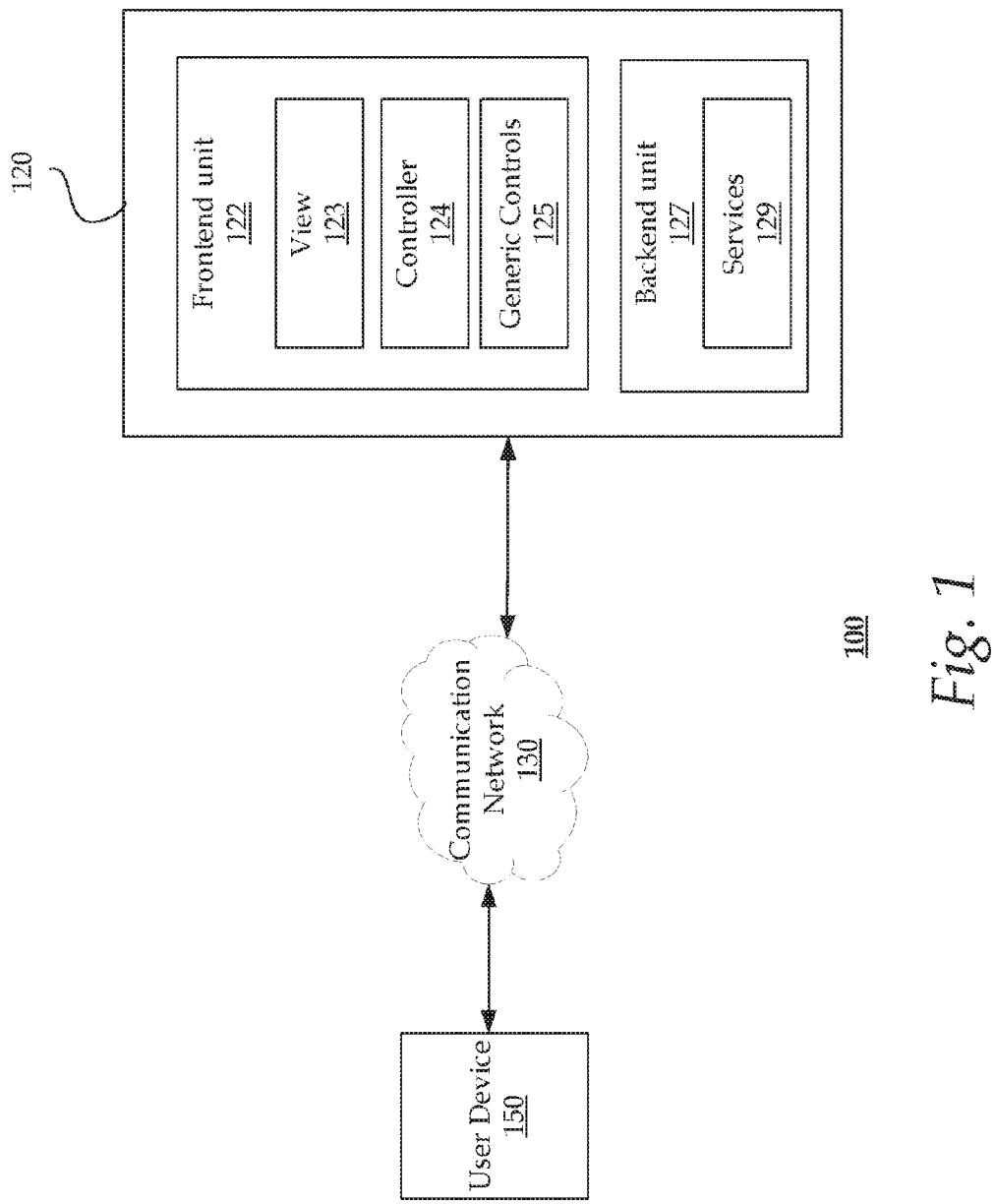
FIG. 1 is a block diagram of an exemplary computing environment.

FIG. 1 shows a block diagram of an exemplary computing environment 100. The environment 100, for example, includes a server 120. The server, for example, is connected to a communication network 130 and interacts with a user device 150. Other types of architectures may also be useful.

A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for the user device, it may be any local computing device with, for example, a local memory and a processor. The memory may be volatile or non-volatile types of non-transitory computer-readable media such as magnetic media, optical media, RAM, ROM, removable media, or any other suitable local or remote memory component. The user device may include a personal computer (PC), a tablet PC, a workstation, a network computer or a mobile computing device, such as a laptop, a smart phone device or a tablet. Other types of processing devices may also be used. Illustratively, the environment includes one user device. It is to be understood, however, that the environment may include numerous user devices connected to the communication network. The user devices may be any type or combination of types of user devices.

As discussed, the various components of the network are connected through the communication network. For example, components of the network may be connected by internet. Other types of networks or network connections may also be useful. For example, the network connections may include a WIFI or a 3G/4G/LTE connection. In some cases, the network may be a cloud. A user may connect to the server using the user device. Other types of configurations may also be useful.

A user may access various applications in the server using the user device. For example, the user device comprises a graphical user interface (GUI). A GUI may provide an efficient and user-friendly manner of presenting information or communicating with the server. Other types of user interfaces may also be useful. In other implementations, the server may include an application loaded onto the user device.

The server, in one implementation, facilitates development of UIs. A UI may include various types of components such as controls (e.g., buttons, lists, tab strips), views and layouts. Other types of UI components may also be useful. The framework may be used, for example, to modify the UI components. For example, a user may modify the components of a UI of a software application or app. The framework may also be implemented for invoking the callback functions in other configurations such as backend scenarios of an app.

The server includes frontend and backend units 122 and 127. In some implementations, the frontend unit displays data to the user, handles events such as user events and communicates with the backend unit. The events include, for example, selecting or clicking a UI control and resizing a UI control. Other types of events are also useful. In one implementation, the frontend unit includes a view module 123, a controller module 124 and generic controls 125. Providing the frontend unit with other modules may also be useful.

The view module 123 defines components or objects. For example, the view module defines the frontend controls. In one implementation, the view module contains the definitions of the components. For example, the view module contains button definitions for button controls in the UI. Each button definition includes the control properties of the button for example, which are registered to a context. A context is a reference to a set of callbacks that may be triggered at once. Each context, for example, is a unique string or key. The view module performs registration of the components. For example, each component that is to be modified using the generic pattern is registered with one or more callback functions to a specific context. The context may be invoked or called by the controller module 124. Providing definition for other types of components or objects and other information in the definition may also be useful. The view module, for example, is a configuration file containing the component definition. The definition of the components may be implemented in formats such as eXtensible Mark-up Language (XML) or JavaScript Object Notation (JSON).

The controller module 124 contains logics for handling requests to the backend. In one implementation, the controller module contains the callbacks and trigger of the components. The controller module, for example, is a configuration file containing the callback functions and trigger. The file format may be, for example, eXtensible Mark-up Language (XML) or JavaScript Object Notation (JSON). The callback functions may be grouped at one place in the configuration file. For example, the callback functions may be grouped in one code line for each registered component. Such grouping improves the code structure.

In one implementation, the callbacks and trigger are invoked in response to events such as user interactions. For example, a context may be provided to a trigger in response to an event. The trigger executes all callbacks registered to the context. For example, the user may select a different entity in a table control which has a different status. The controller module triggers the callbacks registered under the provided context in response to the user selection. As a result, the field properties for buttons representing possible actions on the entities change. Accordingly, the view and controller modules implement the generic callback handling framework with a registration-trigger-callback pattern.

The generic controls 125 may be controls existing in the UI where the UI component modifications is performed. The generic controls may be any UI controls such as buttons, tables, lists, tab-strips. Other types of components or objects may also be useful. The generic controls may be instantiated by the view module and handled by the controller module. It should be noted that the view and controller modules and generic controls may also be implemented at the backend unit. Further, it should be appreciated that the registration-trigger-callback pattern may be implemented with other components or objects and are not limited to components in a UI.

In some implementations, the components may be provided by third party extensions. For example, components from third party extensions may be registered using the same context as the local components. For example, the components of the extensions may be registered using defined or existing context names as currently used by the local components without creating a new context name. As such, the callbacks of the extension may be invoked by an unmodified trigger. Additionally, the trigger advantageously maintains stability in cases where new components are registered, for example, on UI enhancement.

As for the backend unit, it provides services 129 such as data, resources (e.g., libraries) and/or functionalities that may be accessed by the frontend unit. In some implementations, the backend unit contains resources for providing services in response to events or requests generated by the frontend unit. For example, the backend unit contains services for building or developing software applications. In some implementations, the backend unit stores data from various sources such a data repository, relational databases, other types of systems and organizations. The data source may include database files, operational systems, reports, spreadsheets, XML, files, flat files. Providing other types of data from various data sources may also be useful. The data may be organized in, for example, tables or views.

The framework may be integrated, for example, in a data distribution optimizer tool used for distributing data across database systems. For example, the generic callback handling framework may be applied for status transitions to trigger field property changes. The framework may be used in, for example, HANA Data Warehouse Foundation by SAP SE. Other types of applications may also be useful.

It should be appreciated that the different modules of the server may be located on different machines. For example, the view module, controller module and generic controls may be implemented on different physical machines or computer systems. It should further be appreciated that the different components of the user device 150 may also be located on the server, or vice versa.

Figure 2:
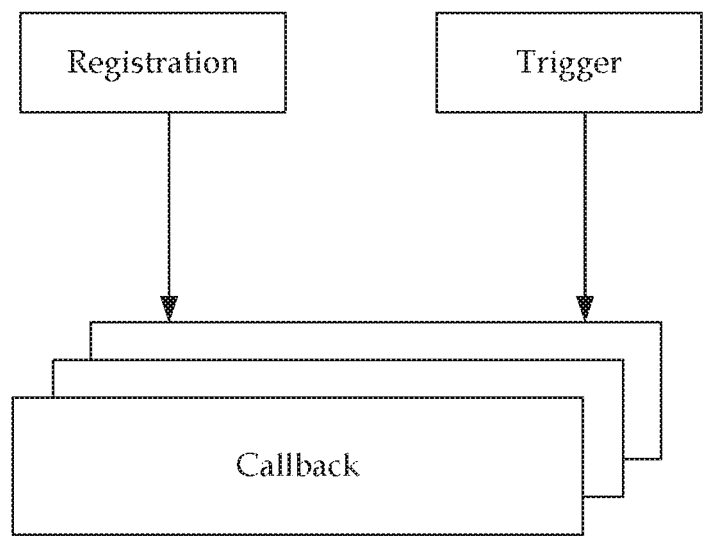
FIG. 2 shows an exemplary data structure of a generic callback handling framework.

FIG. 2 shows an exemplary data structure 200 of the generic callback handling framework. In one implementation, the framework includes a registration-trigger-callback pattern or structure. The registration-trigger-callback pattern may be applied to all types of components or data objects. As such, any type of components may be registered.

In an exemplary implementation, the registration of a component includes providing a specific context name and callback (or callback function). The callback is associated to the specific context name used in the component registration. The callback is a function containing a specific logic to react in response to a trigger. The callback references to the registered component. Multiple components may be registered under the same context name.

The trigger invokes all callbacks that have been registered under a particular context. For example, the trigger invokes all callbacks that have been registered under a context in response to an event. In some implementations, the trigger provides a freely defined object containing information to be evaluated by the callback. The freely defined object may contain any data needed by the callbacks. For example, for button properties, status code values may be required. The status code values may be contained in data that has already been retrieved for display.

The generic callback handling framework may be applied to various different UI development scenarios at the front end for handling UI components. In an exemplary implementation, the framework may be used for field property handling of UI components. For example, the field properties of the UI components may be enabled, disabled, set as read-only. It should be appreciated that the framework for invoking the callback functions may be implemented on other types of components or data objects in other scenarios other than triggering field property changes. The framework is independent of the type of component in its application. Furthermore, as discussed, the generic callback handling framework may also be applied to back end scenarios in an application.

Figure 3:
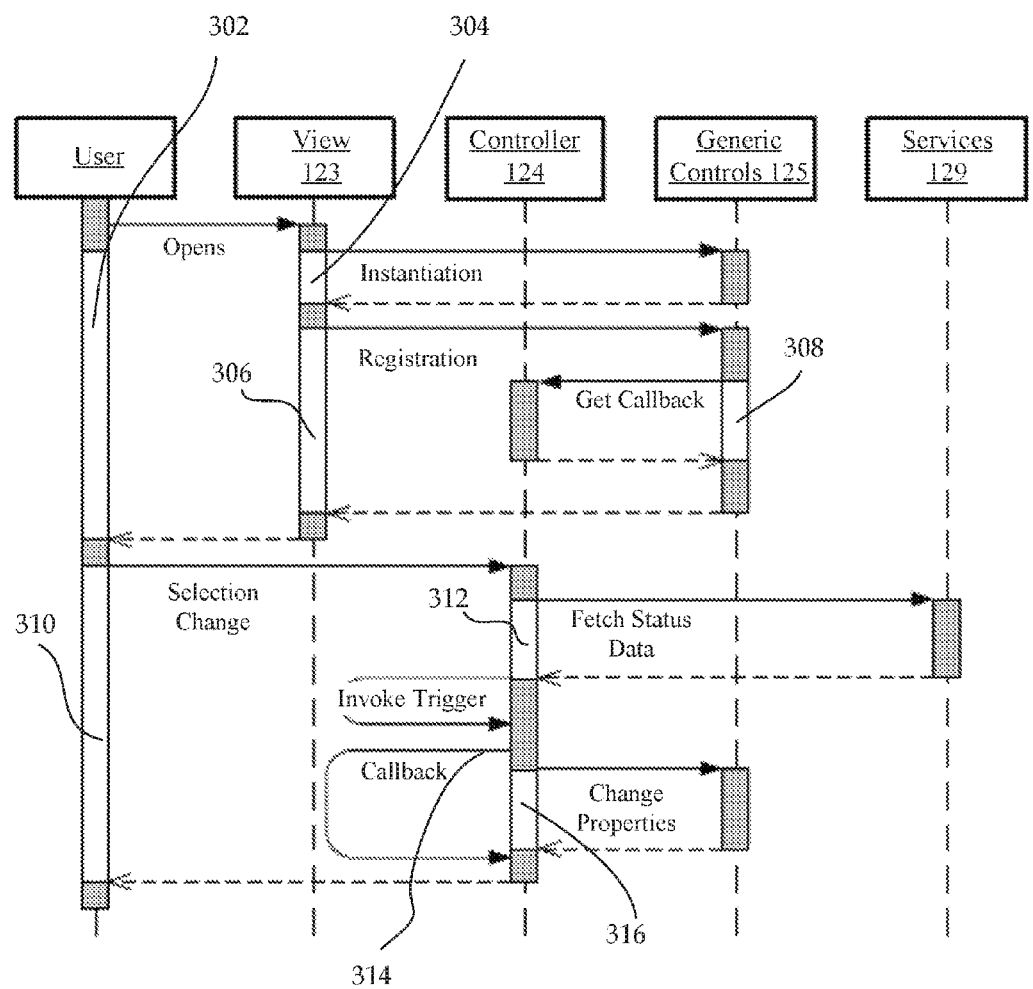
FIG. 3 shows an exemplary sequence diagram for invoking callback functions.

FIG. 3 shows an exemplary sequence diagram 300 for invoking callback functions in accordance with the present framework. In an implementation, the exemplary sequence diagram may relate to triggering field properties of UI controls. It should be noted that the steps in the sequence diagram 300 may be performed in the order shown or a different order. Furthermore, different, additional or fewer steps may be implemented. Even further, the steps may be implemented with the system 100 of FIG. 1, a different system, or a combination thereof. In the following discussion, reference will be made, using like numerals, to the features described in FIG. 1.

At 302, a user opens a view from the view module 123. For example, the user may open the view with respect to the UI (e.g., GUI) which the user desires to modify. At 304, the view module instantiates one or more generic controls 125 of the UI on a display of the user device. At 306, the view module performs registration of the UI controls. During the registration, at 308, the controls retrieve callback functions from the controller module 124. The registration provides a specific context name and one or more callbacks for each UI control. In other words, each component or object is registered with one or more callback functions under a specific context. Multiple components may be registered under a particular context.

At 310, an event may be initiated by the user. For example, the user may perform a selection change on an instance of a UI control. The selection change may include hovering over the UI control, clicking or otherwise selecting a portion of the UI control. For example, the user may select a different entity in a table control which has a different status. The controller module receives the selection change and, at 312, responds by fetching status data of the control instances from services 129 at the backend unit. Based on the fetched status data, the controller module invokes a trigger. In this example, the trigger may be invoked by a callback function that is fired upon return of an asynchronous backend call (e.g., asynchronous JavaScript and XML, or AJAX).

At 314, the trigger invokes the callbacks that have been registered under a context which is provided to the trigger. For example, the callback functions of all registered components belonging to the same context are triggered. The callbacks may be triggered at one central point. For example, all the callbacks registered under the same context may be triggered in response to a single event such as the user selection. At 316, the callbacks modify the registered controls which they reference to. For example, a callback changes the field properties of a UI control which it references to. As a result, the field properties for buttons representing possible actions on the entities change. For example, buttons or tabs may be disabled, enabled, or editable. The controller module then displays the updated UI controls of the UI.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for generic callback handling, comprising:
   a non-transitory memory device for storing computer readable program code; and
   a processor in communication with the memory device, the processor being operative with the computer readable program code to:
   register a first component of a software application in a callback registry, the registration comprising the first component, a first context, and one or more callback functions for the first component, such that in the callback registry multiple components may be registered under the first context and the first component may be registered under multiple contexts, wherein the registration is performed by a view module containing configuration information of the multiple components;
   receive an event with the first context;
   invoke a trigger in response to receiving the event, wherein the first context is provided to the trigger; and
   based on the trigger, execute a set of callbacks that are registered under the first context as indicated in the callback registry, wherein the set of callbacks are executed for all components to which the callbacks are registered under the first context as indicated in the callback registry.

2. The system of claim 1, wherein the configuration information comprises definitions of the components including a context name, and the configuration information in the view module includes an eXtensible Mark-up Language or JavaScript Object Notation format.

3. The system of claim 1, further comprising callback functions grouped in one code line for each registered component in a configuration information stored in a controller module.

4. The system of claim 1, wherein registering the components comprises registering components of third party extensions using one or more contexts existing in the configuration information.

5. The system of claim 1, wherein registering the components comprises registering user interface components of a user interface.

6. The system of claim 5, further comprising fetching status data of the user interface components in response to the event and invoking the trigger based on the status data.

7. The system of claim 1, wherein the trigger provides a freely defined object containing information to be evaluated by the set of callbacks.

8. A computer-implemented method for handling callbacks, comprising:
associate one or more callback functions with a first context;
register a first component of a software application in a callback registry, wherein the first component is registered under the first context, such that the registration of the first component comprises the first component, the first context, and an association between the first component and at least one of the one or more callback functions associated with the first context, and the first component may be registered under multiple contexts, wherein the registration is performed by a view module containing configuration information of the first component;
receive an event associated with the first context; in response to the event, invoke a trigger with the first context; and based on the trigger, execute a set of callbacks via the first context, wherein the set of callbacks comprises one or more callback functions associated with the first context and the set of callbacks are executed for all components associated with the respective callbacks that are registered under the first context as indicated in the callback registry.

9. The method of claim 8, wherein the registration is performed by a view module containing configuration information of the components, wherein the configuration information comprises definitions of the components including a context name.

10. The method of claim 8, further comprising callback functions grouped in one code line for each registered component in a configuration information stored in a controller module.

11. The method of claim 8, wherein registering the components comprises registering user interface components.

12. The method of claim 11, wherein triggering the set of callbacks comprises triggering field properties of user interface controls.

13. The method of claim 11, further comprising fetching status data of the user interface controls in response to the event and invoking the trigger based on the status data.

14. The method of claim 8, wherein the trigger provides a freely defined object containing information to be evaluated by the set of callbacks.

15. A non-transitory computer-readable medium having stored thereon program code, the program code executable by a computer to perform steps for handling callbacks, comprising:
register one or more callback functions with a first context in a callback registry;
register a first component of a software application in the callback registry,
wherein the first component is registered under the first context, such that the registration of the first component comprises the first component, the first context, and an association between the first component and the one or more callback functions registered with the first context, wherein multiple components may be registered under the first context, such that the first context may have a plurality of callback functions and a plurality of components registered to it, and the first component may be registered under multiple contexts, wherein the registration is performed by a view module containing configuration information of the multiple components;
receive an event having the first context; in response to the event, invoke a trigger, wherein the first context is provided to the trigger; and based on the trigger, execute a set of callbacks via the first context, wherein the set of callbacks comprises the callback functions that are registered under the first context as indicated in the callback registry, and the set of callbacks are executed for all the components registered under the first context as indicated in the callback registry.

16. The computer readable medium of claim 15, wherein the registration is performed by a view module containing configuration information of the components, wherein the configuration information comprises definitions of the components including a context name.

17. The computer readable medium of claim 15, wherein registering the components comprises registering components of third party extensions using contexts existing in the configuration information.

18. The computer readable medium of claim 15, further comprising callback functions grouped in one code line for each registered component in a configuration information stored in a controller module.

19. The computer readable medium of claim 15, wherein registering the components comprises registering user interface components of a user interface.

20. The computer readable medium of claim 19, further comprising fetching status data of the user interface components in response to the event and invoking the trigger based on the status data.

* * * * *